United States Patent Office 2,998,365
Patented Aug. 29, 1961

2,998,365
TREATMENT OF DIAMONDS
Jan F. H. Custers, Johannesburg, Union of South Africa, and Henry Brooke Dyer and Robert William Ditchburn, Reading, England, assignors to Industrial Distributors (1946) Limited
No Drawing. Filed Apr. 11, 1955, Ser. No. 500,656
Claims priority, application Union of South Africa Apr. 19, 1954
13 Claims. (Cl. 204—157)

An important, if not predominant, factor that determines the monetary value of a diamond is the colour or lack of colour of the stone. The current taste places less store on stones which are coloured yellow or brown then on those which are colourless or bluish, probably due to the rarity of the colourless or blue stone in comparison with the brown or yellow.

The reason for the particular colouration of diamonds is still not clear but the assumption is that it is due either to the intrusion of impurities into the structure or to deviations from perfection of the structure itself. Based on one or other of these assumptions, several proposals have been put forward and several attempts have been made to improve the commercial acceptability of coloured diamonds by irradiation designed to rearrange the defective structure or to transmute the intruding impurities. The rapid advances in the atomic fission in recent years, placing in the hands of the scientist new irradiating sources of immense power, have added impetus to these researchers, although due to practical difficulties conclusions are still preponderantly theoretical.

The natural brown or yellow colour of diamonds is the result of excessive light absorption towards the violet end of the visible spectrum. Probably this phenomenon is due to the intrusion of impurities into the structure which act as absorption centres. As far as current knowledge goes, there seems to be little or no possibility of so transmuting these impurities by irradiation as to affect their absorbing properties to any significant extent.

The object of this invention is to provide a method of improving the colour (in the commercial sense) of a pale yellow or brown diamond.

According to the invention the diamond to be treated is subjected to irradiation designed to induce such rearrangement of the crystal structure as to render the diamond more light absorbent towards the red end of the visible spectrum.

It will be appreciated that the effect of this procedure is to counteract the absorption towards the violet end of the spectrum by absorption towards the red end; so that, ideally, if the extent and nature of the rearrangement of the lattice is such that the initial excess absorption is exactly counter-balanced along the entire length of the visible spectrum, the original yellow or brown stone will have been decoloured to a more valuable white stone. Obviously this ideal is all but impossible of realisation but nonetheless the dilution or subjugation of the brown or yellow colour by the superimposition of absorption towards the opposite end of the spectrum decolours or recolours the stone to make it more valuable than it was originally.

The irradiation of the diamond may be effected in one of several ways. One way is by bombardment with atomic particles such as electrons or slow neutrons. Another is by subjecting the diamond to the action of gamma rays which penetrate into the structure and alter its atomic arrangement. The diamond may also be irradiated with positrons. The impact of these particles will produce a small effect, but they will also release gamma rays within the surface layers of the diamond and these will be of suitable energy to produce an effect. Mesons and other unstable particles may also produce an effect by their impact and by the action of their decay products. However, no sufficiently powerful sources of positrons or mesons are at present available. Decolourisation by protons, alpha particles and other positively charged particles is also possible but the effects of these particles are less favourable and are confined to very thin surface layers.

The energy and flux density of the radiation depend to some extent on the physical nature of the diamond, and varies for each kind of radiation. Uncontrolled local heating is to be avoided while general heating of the stones during irradiation is undesirable. However, gentle heating during or after irradiation may be advantageous in some cases.

There is a theoretical threshold energy different for each kind of radiation below which the process will not take place. An approximate value of this threshold has been calculated from known data concerning the bond energies of the carbon atoms in the diamond for each kind of radiation. For energies slightly in excess of this theoretical threshold the process is so slow that no result can be detected in any reasonable time. There is therefore a practical threshold, in excess of the theoretical threshold, which is the lowest energy for which detectable changes can be produced under experimental conditions. This practical threshold will vary slightly from diamond to diamond. For reasons stated below it is not usually profitable to carry out the irradiation at or extremely near the practical threshold.

The quality of the result by which is meant the closeness with which the final appearance of the treated diamond approaches that of a stone of high quality for example a diamond classified as water-white by the diamond industry, is determined by:

(i) The initial nature and intensity of the colouration of the diamond;
(ii) The precise adjustment of conditions under which the process is performed.

The way in which the quality of the result is affected by the manner in which the process is carried out will now be discussed.

The quality of the result will usually be highest when the energy of the irradiation is not greatly in excess of the practical threshold energy for the particular type of irradiation. However, there is a serious disadvantage inherent in using radiation of this energy, which is that the time taken for the process to reach completion will be very long. Increase in the energy of the irradiating particles above this value results in a much greater increase in the rate of the process. Furthermore, a limited increase in the irradiation energy above the threshold value does not greatly affect the quality of the result. There is therefore an effective optimum energy of any type of irradiating particle mentioned above, which, while yielding results not much inferior to the best obtainable, yet reduces considerably the time necessary for the completion of the process. The optimum value selected for any particular diamond will depend upon the initial condition of the diamond, and the quality of result desired. The quality of the result will also be affected by the flux density of the irradiation if this flux density is too high. It is desirable that the atomic re-arrangement caused by the impact of one or more irradiating particles or irradiations should be completed and the local excess of energy be dissipated in the main body of the diamond before further particles or rays enter the same small region of the crystal thereby causing this region to have an energy in excess of that necessary for undesirable secondary changes to occur. It is also necessary to restrict the flux density so that excessive heating of the crystal as a whole does not occur. The permissible maximum flux densities depend upon (1) The kind of radiation used;
(2) The ambient temperature of crystal;
(3) The efficiency of arrangements for preventing a general rise of temperature during irradiation; and
(4) To a small extent upon the properties of the particular stone.

If an excessive flux density is used, secondary effects will tend to cause undesirable colouration and the quality of the final result will be adversely affected. With seriously excessive flux densities the treated stone may be of lower quality than it was initially.

The rate at which the process proceeds increases with increase of the flux density. There is an effective optimum flux density which, while not greatly effecting the quality of the result, will reduce considerably the time taken for the process to be completed.

The possible forms of irradiation will now be discussed in turn with reference, the data obtained in practice (where these are obtainable).

In one form of the invention the diamond to be treated is subjected to bombardment by electrons having an energy within the range of 0.4 m.e.v. and 1.0 m.e.v. In other words with this form of irradiation the practical threshold is about 0.4 m.e.v.

The electrons may be accelerated, for example, by a Van de Graaff generator or a cascade generator or other electrotechnical device for high voltages and suitable beam current. The electron beam may be focused on to the diamond under treatment or a number of stones may be simultaneously treated. If the electron beam is permitted to emerge from the vacuum tube through, for example, an aluminum foil window, before striking the surface of the diamond under treatment, the diamond may be cooled, for example, by mounting it on a metal pipe through which cold water flows, or by directing a jet of cold air on to its surface, or both methods may be used. If the diamond is contained within the vacuum tube it must be cooled, for example, by mounting it on a thin metal plate, which is cooled by circulating cold water.

There is an effective optimum energy of the irradiating electrons, which is about 0.7 m.e.v. Corresponding to this electron energy, there is an optimum beam current, i.e. flux density of electrons, whose value will partially be determined by the efficiency of cooling. For example, for a diamond sunk in Wood's metal, so that only the surface to be irradiated is exposed in vacuum, and cooled efficiently by water flowing under a metal plate with which the Wood's metal surrounding the diamond makes a good thermal junction, irradiated by 0.7 m.e.v. electrons, a beam current of between 15 and 25 microamps., say 20 microamps., per square centimetre is satisfactory.

So far no mention has been made of the total irradiation dose necessary to produce the best result. This cannot be absolutely defined as it depends upon the initial quality and intensity of colouration of the diamond to be treated.

Electron irradiation affects only the region of the diamond below the surface irradiated, to a depth which depends upon the energy of the electrons used. For the diamond to appear, after treatment, nearly similar to a "water-white" diamond, when viewed in a direction normal to the face irradiated, a dose in excess of that required merely to decolourise the surface layer, must be administered, so that the excess of change in the surface layer may compensate for the underlying layers of diamond which have not been affected by this process. In a practical case, in which a diamond was irradiated by 0.5 m.e.v. electrons a dose of 40 microampere hours per square centimetre was sufficient to decolourise a pale brown diamond, of thickness 1.8 mm., so that its quality was improved.

Furthermore, since the electron beam is rapidly absorbed by the diamond, the total dose may depend also on the thickness of the diamond. Thin diamonds may be irradiated throughout their bulk, while in thicker diamonds practical considerations, such as the maximum energy available from the source and the danger inherent in excessive radiation, may limit the depth of de- or re-colouration.

The decolourisation of the diamond effected by the method of the invention is permanent provided the diamond is not heated in excess of 350° C.

In a practical example of the invention a brown diamond was irradiated with 0.4 m.e.v. electrons, the total dose being about 40 microampere hours per square centimetre. As a control, the C.I.E. co-ordinates for the whitest specimen available, were calculated. The following results were obtained:

| Diamond/C.I.E. Coordinates | Brown Specimen before Treatment | Brown Specimen After Treatment | Control Diamond |
| --- | --- | --- | --- |
| X | 0.3395 | 0.3316 | 0.3341 |
| Y | 0.3392 | 0.3319 | 0.3341 |
| Z | 0.3213 | 0.3365 | 0.3318 |
| T, percent | 67.0 | 66.1 | 70.0 |

The co-ordinates (X, Y, Z) do not refer to real colours—they define the proportions of imaginary artificial stimuli, so defined as to include all spectral colours within the colour triangle.

The symbol T in the table refers to the "brightness" of the specimen; it is a mean transmission value, weighted according to the variation in sensitivity of the eye, with wave length. For a diamond whose C.I.E. co-ordinates indicate a colourless stone, it is an inverse measure of the "greyness" of the diamond. The value 70% can be taken to represent the value of T for a pure "white" stone uncorrected for reflection losses. (This is not strictly true for the control shows absorption bands between 4150 A. and the visible limit; however, the sensitivity of the eye is falling rapidly here, and the effect is not large. This would also account, in part, for the deficiency in blue of this specimen.)

As can be seen the test specimen was quite brown, shown by the deficiency in Z (blue), which is quite substantially below the value for the control. After irradiation, the stone shows a slight excess of blue (Z is more than 0.3333), indicating a slight "overdose" of irradiation, from this point of view.

The value of T has fallen to 66.1% representing a detectable difference from 67%.

In an industrial process it may be desirable to treat a large number of diamonds simultaneously. Some will then have received an excessive dose when others have received an optimum dose. A small adjustment may be made in respect of those which have received a slightly excessive dose by controlled heating to temperatures of about 450° C. Only a very small correction may be made in this way.

In another form of the invention the diamond to be treated is subject to irradiation by pure gamma rays (by which is meant that the gamma radiation is substantially free from admixture with alpha particles, neutrons or electrons), the energy of the radiation being in excess of about 0.5 m.e.v.

For example, radio-cobalt, which is a radioactive element, emitting gamma-rays of energies about 1.1 and 1.3 m.e.v., may be used. A dose in excess of $10^9$ roentgens is necessary to produce a detectable effect in a stone 5 mms. thick. The changes produced by this process have an equal density distribution throughout the whole diamond crystal.

So far no mention has been made of the total irradiation dose necessary to produce the best result. This cannot be absolutely defined as it depends upon the initial quality and intensity of colouration of the diamond to be treated. It also depends upon the size of the diamond inasmuch as this affects the total path traversed by light from the place where it enters the diamond to the place where it leaves the diamond to fall upon the eye of the observer.

For example, a nearly colourless stone in the form of a rectangular block 5.35 mm. x 3.9 mm. was irradiated with radio-cobalt and subsequently measured through a thickness of 5.35 mm. It was given 4 successive doses each of approximately $0.8 \times 10^9$ roentgens. After the first dose there was a slight change of colour just visually perceptible. After the second dose it was possible to see that the colour was bluish green. After the third and fourth doses a definitely blue green colour was observed. The strength of the absorption in the red end of the spectrum was measured at each stage and found to increase in proportion to the dose. The absorption produced in the first stage would have produced a decolourisation effect on a very pale brown stone. The most useful range for decolourisation (apart from heating which will be mentioned below) is between the 2nd and 4th stages (i.e. the dose range 1.5 to $3.0 \times 10^9$ roentgens) for a diamond of this thickness. Smaller diamonds may require larger doses.

The energy (1.1 to 1.3 m.e.v.) of the gamma rays given by radio-cobalt is higher than the optimum. The colour produced in a perfectly white stone is blue-green, whereas a more strongly blue colour is optimum for most stones. An improvement may be obtained by using gamma-rays of energies less than 1.0 m.e.v. The optimum energy is probably about the middle of the range 0.5 to 0.9 m.e.v. gamma-rays with energies in this range may be produced by allowing a strong beam of electrons of suitable energy to fall upon a target. It may however be more convenient to use radio-caesium or other radio-active materials emitting gamma-rays of suitable energy when large sources of these materials are available. However, at present, the most convenient way of producing a useful effect is by means of radio-cobalt.

If the diamond is heated the colouration effect may be reduced. For example, the colouration of the specimen mentioned above was reduced to about one third of its original value. The remaining colour is slightly more favourable than the original colour. Further heating at 450° C. for a period of 48 hours produced no detectable change but heating to 600° C. produced a yellow colour.

This effect may be usefully employed in two ways. First, for many stones, the best result will be obtained by giving a dose of gamma-rays considerably in excess of that required to neutralize the original colour and then heating in a controlled way until the stone reaches an optimum colour. Secondly in an industrial process it may be desirable to treat a large number of diamonds simultaneously. Some will then have received an excessive dose when others have received an optimum dose. A small adjustment may be made in respect of those which have received a slightly excessive dose by controlled heating to temperatures of about 450° C. This correction will be ineffective if the optimum dose is greatly exceeded.

In the two forms of the invention discussed above applicants have been able to verify their deductions from the general statement of the invention. As said above the invention is not limited to irradiation by electrons and gamma-rays.

From the results obtained from the limited resources available to the applicants, it is clear that bombardment by slow neutrons would also cause the required rearrangement of the crystal structure. It is, however, impossible to specify practical or optimum threshold energies with any degree of exactness.

Neutrons produced, for example, in an atomic pile, may after their energy has been reduced, be allowed to strike the diamond to be treated. The mean energy of fission neutrons is greatly in excess of the energy required to produce a good result. Some process must be employed therefore, to reduce considerably the energy of the neutrons incident upon the diamond, if they are initially produced in an atomic pile. However, the energy of the neutrons must be considerably in excess of that of thermal neutrons.

Such methods as, at present, exist for obtaining neutrons of energies lying within the required range severely limit the available flux density of these neutrons. This, coupled with the small collision cross-section of a carbon nucleus for a neutron, means that there is no danger, under existing conditions, of exceeding the effective optimum flux density for this process. The quality of the result will, however, be very adversely affected if there is an admixture of appreciable number of high energy neutrons. The changes produced have an equal density distribution throughout the whole of the diamond treated.

Once more the total irradiation dose will depend upon the initial quality and intensity of colouration of the diamond to be treated. The decolouration is also permanent provided the diamond be not heated in excess of 350° C.

As in the other forms of the invention small adjustments may be made in respect of these diamonds which have received a slightly excess dose by controlled heating to a temperature of about 450° C.

We claim:
1. A method of improving the color of a diamond by increasing its light absorption towards the red end of the visible spectrum consisting in exposing the diamond to gamma radiation having an energy between 0.5 and 1.3 m.e.v.
2. The method claimed in claim 1 consisting in exposing the diamond to the gamma radiation of radio-cobalt.
3. The method claimed in claim 2 in which the irradiation dose is in excess of $10^9$ roentgens.
4. The method claimed in claim 3 in which the dose is between 1.5 and $3.0 \times 10^9$ roentgens.
5. A method of improving the color of a diamond by increasing its light absorption towards the red end of the visible spectrum consisting in exposing the diamond to gamma radiation having an energy between 0.5 and 1.3 m.e.v. and thereafter heating the diamond to anneal the color change caused by irradiation.
6. The method claimed in claim 5 in which the diamond is heated to a temperature of about 450° C.
7. A method of improving the color of a diamond by increasing its light absorption towards the red end of the visible spectrum consisting in exposing the diamond to the gamma radiation of a radio-active material emitting gamma rays of an energy between 0.5 and 0.9 m.e.v.
8. The method claimed in claim 7 in which the diamond is exposed to the gamma rays emitted by radio-ceasium.
9. The method claimed in claim 8 in which the diamond is heated after irradiation to anneal the color change caused by irradiation.

10. The method claimed in claim 9 in which the diamond is heated to a temperature of about 450° C.

11. A method of improving the color of a diamond by increasing its light absorption towards the red end of the visible spectrum consisting in exposing the diamond to the gamma irradiation of radio-cobalt until the irradiation dose is in excess of $10^9$ roentgens and thereafter heating the diamond to anneal the color change caused by irradiation.

12. The method claimed in claim 11 in which the diamond is heated to a temperature of about 450° C.

13. The method claimed in claim 12 in which the irradiation dose is between 1.5 and $3.0 \times 10^9$ roentgens.

References Cited in the file of this patent

UNITED STATES PATENTS

| 2,604,596 | Ahearn | July 22, 1952 |

FOREIGN PATENTS

| 17,666 | Great Britain | Sept. 24, 1903 |
| 660,719 | Great Britain | Nov. 14, 1951 |